United States Patent [19]
Bolton, Jr.

[11] Patent Number: 5,779,252
[45] Date of Patent: Jul. 14, 1998

[54] COOLER CADDY

[76] Inventor: Albert Bolton, Jr., 2650 E. 73rd St., Chicago, Ill. 60649

[21] Appl. No.: 599,532

[22] Filed: Feb. 5, 1996

[51] Int. Cl.$^6$ .................................. B62B 3/02
[52] U.S. Cl. .................... 280/47.371; 280/35; 280/79.11
[58] Field of Search .................. 280/30, 32.6, 35, 280/33.991, 87.01, 47.34, 47.35, 47.371, 79.11, 79.3

[56] References Cited

U.S. PATENT DOCUMENTS

| | | | |
|---|---|---|---|
| 1,164,332 | 12/1915 | Brown | 280/79.11 |
| 1,643,268 | 9/1927 | Burnwatt | 280/32.6 |
| 1,717,358 | 6/1929 | Adcock et al. | 280/35 |
| 2,069,476 | 2/1937 | Keil | 280/79.11 |
| 2,487,950 | 11/1949 | Souligne | 280/35 |
| 3,305,117 | 2/1967 | Ford | 280/33.991 |
| 4,166,638 | 9/1979 | DePrado | 280/79.11 |
| 5,228,716 | 7/1993 | Dahl | 280/47.34 |
| 5,249,823 | 10/1993 | McCoy et al. | 280/87.01 |
| 5,328,192 | 7/1994 | Thompson | 280/47.371 |
| 5,330,211 | 7/1994 | Nicholson | 280/32.6 |
| 5,465,996 | 11/1995 | Wisz | 280/35 |
| 5,660,637 | 8/1997 | Dodge | 280/35 |

*Primary Examiner*—Brian L. Johnson
*Assistant Examiner*—Frank Vanaman

[57] ABSTRACT

A lightweight, aluminum cooler caddy is supported by four wheels and is of a lengthwise telescoping construction. A pivoting adjustable length handle allows the caddy to be pulled by a user, and tiedown straps which hold a cooler to the caddy also operate to lock the caddy at a desired length. An angulated rear brace facilitates a slidable lifting of the cooler from the caddy, and a strap storage compartment is positioned beneath the brace.

1 Claim, 3 Drawing Sheets

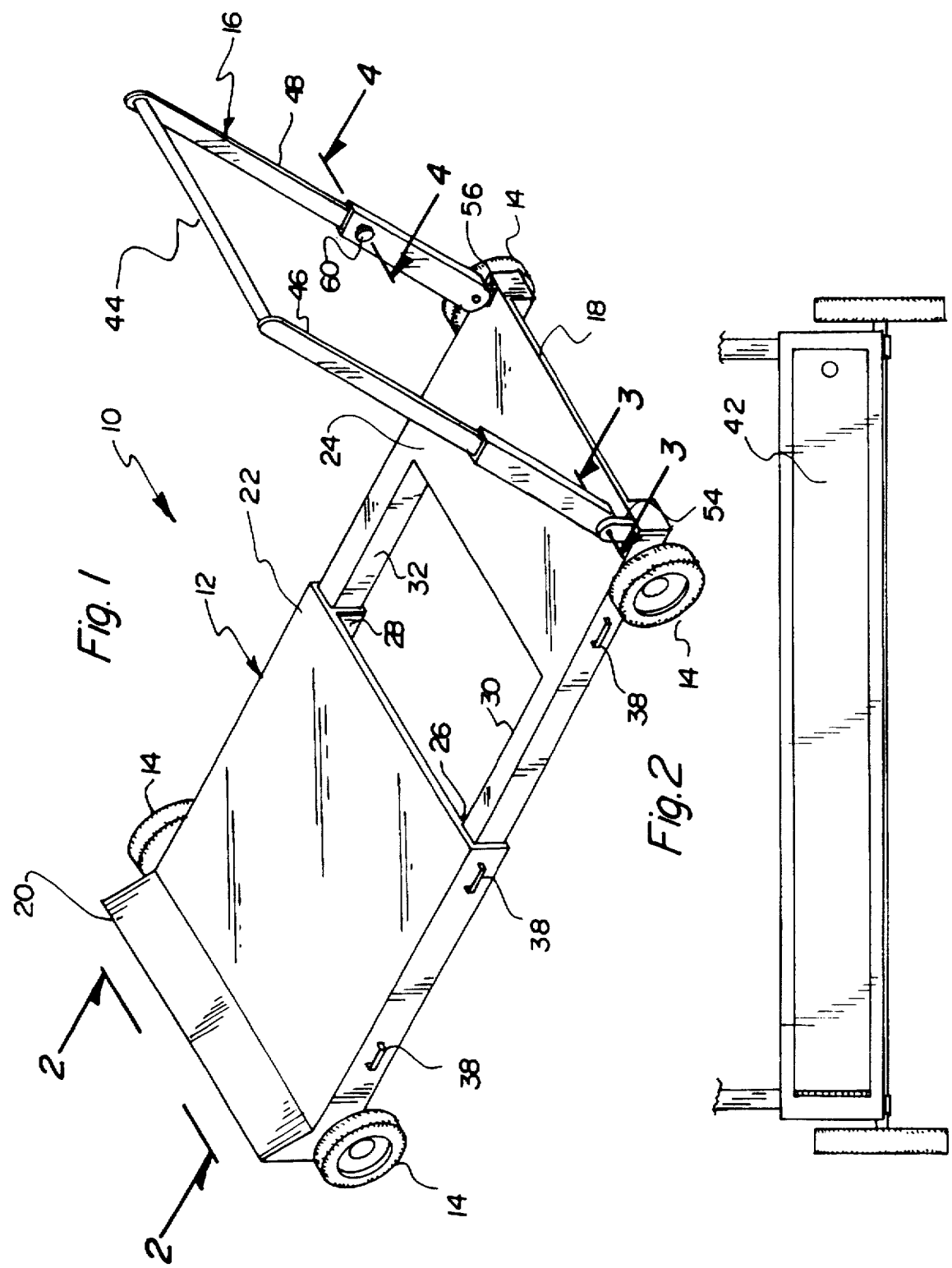

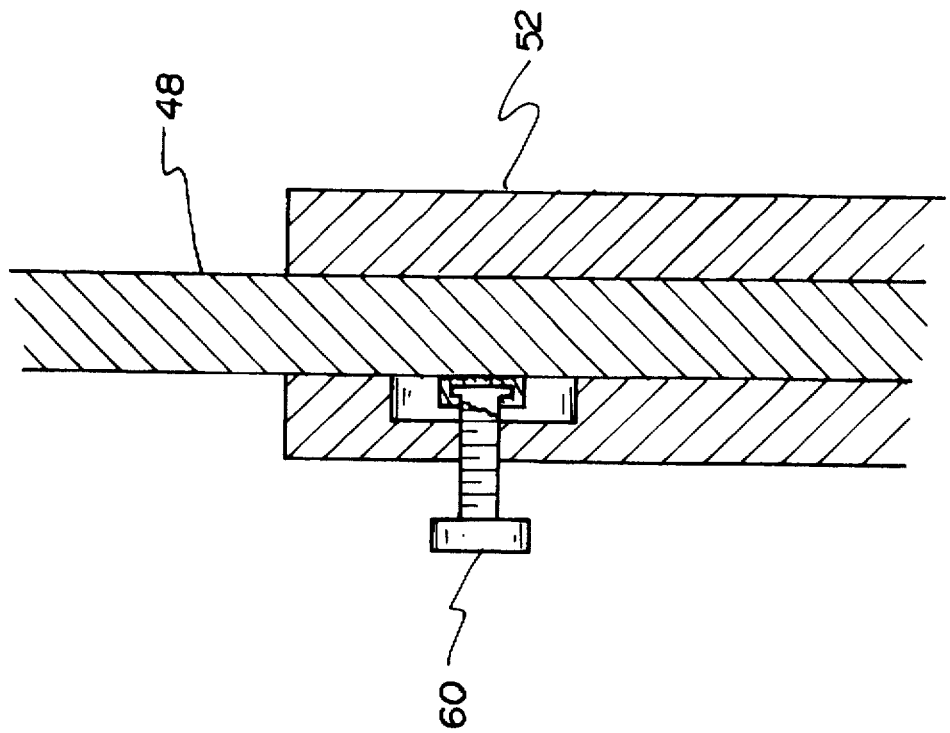
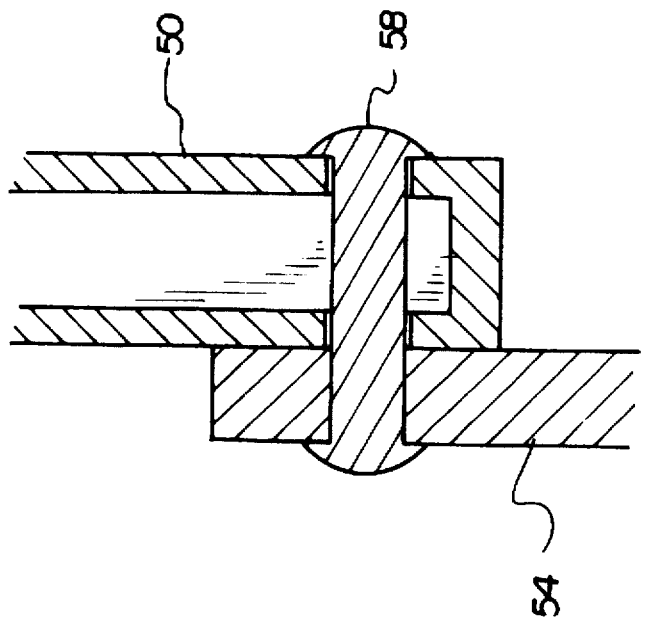

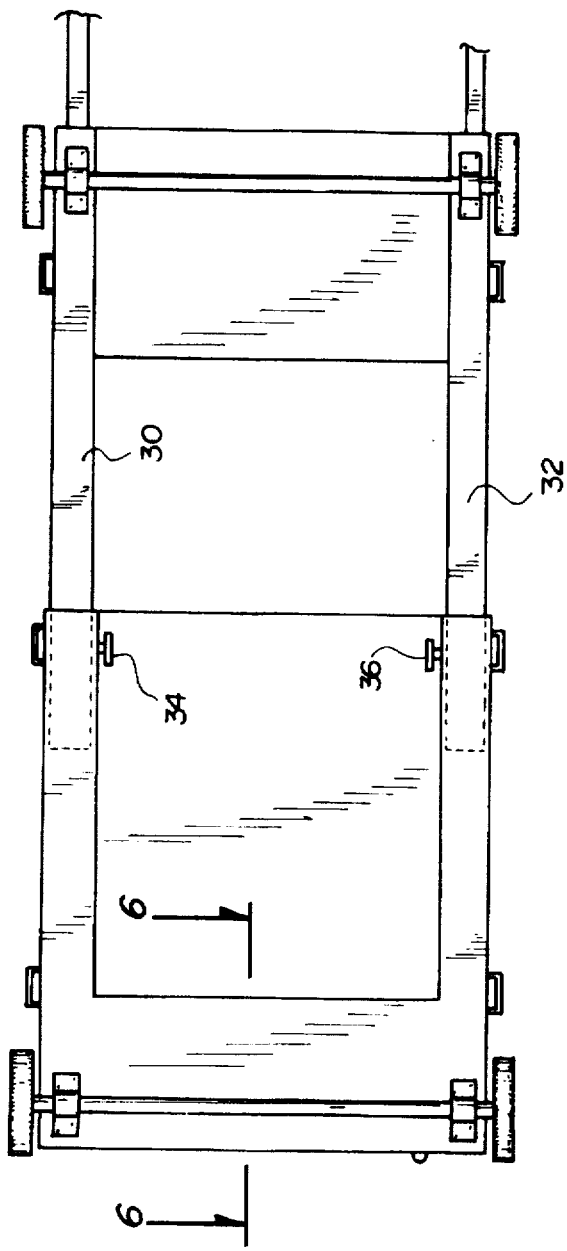
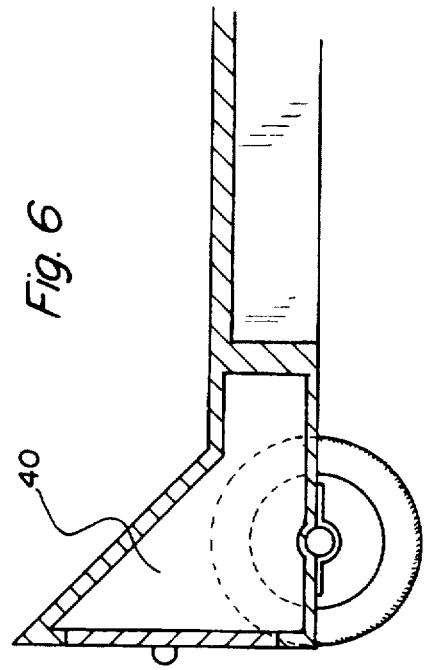

COOLER CADDY

BACKGROUND OF THE INVENTION

1. Field of the Invention

The present invention relates to wheeled carts and more particularly pertains to a caddy for storing and transporting a cooler.

2. Description of the Prior Art

The use of wheeled caddies is well known in the prior art. In this respect, a large number of patents have been granted relating to various functional and structural aspects of wheeled caddies and carts. Due to the large number of issued patents, the art is generally described as being a crowded art, and there is a continuing need and demand for new and improved caddies by the consuming public. While all of the prior art patents disclose caddies which fulfill their respective particular objectives and requirements, and are most likely quite functional for their intended purposes, it will be noticed that few, if any, of these patents disclose caddies which have a storage platform that is of an adjustable length and that is held at a precise length by tiedown straps which wrap around the load positioned thereon. As such, there apparently still exists the need for such adjustable length caddies and in this respect, the present invention substantially fulfills this need.

SUMMARY OF THE INVENTION

In view of the foregoing disadvantages inherent in the known types of cooler caddies now present in the prior art, the present invention provides a new cooler caddy having advantages and improvements which are patentably distinct over similar devices and methods which may already be patented or commercially available. As such, the general purpose of the present invention, which will be described subsequently in greater detail, is to provide a cooler caddy and method which has many of the advantages of the cooler caddies mentioned heretofore and many additional novel features which are not taught or shown in the prior art.

To attain this, the present invention generally comprises a lightweight, aluminum cooler caddy which is supported by four wheels and is of a lengthwise telescoping construction. A pivoting adjustable length handle allows the caddy to be pulled by a user, and tiedown straps which hold a cooler to the caddy also operate to lock the caddy at a desired preselected length. An angulated rear brace facilitates a slidable lifting of the cooler from the caddy, and a strap storage compartment is positioned beneath the brace.

There has thus been outlined, rather broadly, the more important features of the invention in order that the detailed description thereof that follows may be better understood, and in order that the present contribution to the art may be better appreciated. There are additional features of the invention that will be described hereinafter and which will form the subject matter of the claims appended hereto.

In this respect, before explaining at least one embodiment of the invention in detail, it is to be understood that the invention is not limited in its application to the details of construction and to the arrangements of the components set forth in the following description or illustrated in the drawings. The invention is capable of other embodiments and of being practiced and carried out in various ways. Also, it is to be understood that the phraseology and terminology employed herein are for the purpose of description and should not be regarded as limiting.

As such, those skilled in the art will appreciate that the conception, upon which this disclosure is based, may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

Further, the purpose of the foregoing abstract is to enable the U.S. Patent and Trademark Office and the public generally, and especially the scientists, engineers and practitioners in the art who are not familiar with patent or legal terms or phraseology, to determine quickly from a cursory inspection the nature and essence of the technical disclosure of the application. The abstract is neither intended to define the invention of the application, which is measured by the claims, nor is it intended to be limiting as to the scope of the invention in any way.

It is therefore an object of the present invention to provide a new cooler caddy and method which has many of the advantages of the cooler caddies mentioned heretofore and many novel features that result in a cooler caddy which is not anticipated, rendered obvious, suggested, or even implied by any of the prior art cooler caddies, either alone or in any combination thereof.

It is another object of the present invention to provide a new cooler caddy which may be easily and efficiently manufactured and marketed.

It is a further object of the present invention to provide a new cooler caddy which is of a durable and reliable construction.

An even further object of the present invention is to provide a new cooler caddy which is susceptible of a low cost of manufacture with regard to both materials and labor, and which accordingly is then susceptible of low prices of sale to the consuming public, thereby making such cooler caddy economically available to the buying public.

Still yet another object of the present invention is to provide a new cooler caddy which provides in the apparatuses and methods of the prior art some of the advantages thereof, while simultaneously overcoming some of the disadvantages normally associated therewith.

These together with other objects of the invention, along with the various features of novelty which characterize the invention, are pointed out with particularity in the claims annexed to and forming a part of this disclosure. For a better understanding of the invention, its operating advantages and the specific objects attained by its uses, reference should be had to the accompanying drawings and descriptive matter in which there is illustrated preferred embodiments of the invention.

BRIEF DESCRIPTION OF THE DRAWINGS

The invention will be better understood and objects other than those set forth above will become apparent when consideration is given to the following detailed description thereof. Such description makes reference to the annexed drawings wherein:

FIG. 1 is a perspective view of the cooler caddy comprising the present invention.

FIG. 2 is an elevational view of the invention as viewed along the line 2—2 in FIG. 1.

FIG. 3 is a cross-sectional view of the invention as viewed along the line 3—3 in FIG. 1.

FIG. 4 is a cross-sectional view of the invention as viewed along the line 4—4 in FIG. 1.

FIG. 5 is a bottom plan view of the invention.

FIG. 6 is a cross-sectional view of the invention as viewed along the line 6—6 in FIG. 5.

DESCRIPTION OF PREFERRED EMBODIMENTS

With reference now to the drawings, and in particular to FIGS. 1–2 thereof, a new cooler caddy embodying the principles and concepts of the present invention and generally designated by the reference numeral 10 will be described.

More specifically, it will be noted that the cooler caddy 10 essentially consists of an adjustable support platform 12 supported on four all-terrain, rugged plastic wheels 14. A pivotally movable handle assembly 16 is attached to a front end 18 of the caddy 10, and an angulated support brace 20 is provided at the opposed end of the caddy.

The support platform 12 includes a first top support plate 22 and a second top support plate 24 telescopingly received therein. In this regard, the first support plate 22 is provided with aligned and oppositely disposed rectangularly-shaped channels 26, 28 along side edges thereof, and the second support plate 24 has respective rectangularly-shaped arms 30, 32 which are telescopingly received within the channels 26, 28. As shown in FIG. 5, a pair of manually rotatable thumb screws 34, 36 may be used to initially position the respective arms 30, 32 at a desired extension relative to their respective channels 26, 28, such thumb screws functioning as a first locking means for preventing relative movement between the support plates 22, 24.

A plurality of metallic tiedown-receiving hooks, all of which are generally designated by the reference numeral 38, are integrally or otherwise fixedly secured to outside surfaces of the support plates 22, 24. Once an unillustrated cooler is placed on top of the support plates 22, 24, conventional tiedown straps may be attached to the hooks 38 and looped over the cooler in a tight manner so as to prevent any further relative movement between the plates 22, 24, thereby effectively serving as a second locking means for controlling and securing a desired length of the caddy 10.

The angulated brace 20 is rearwardly sloped relative to the first support plate 22 so as to allow an easy positioning and removal of a cooler from the caddy 10. More particularly, if the brace 20 was perpendicular relative to the top support plate 22, it would be much more difficult to remove a cooler which is heavily laden with ice and beverages. The upward angulated positioning of the brace 20 allows for a slidable removal in a much more easy and now well understood manner.

As shown in FIGS. 2 and 6, the angulated brace 20 forms a part of an interior storage compartment 40 in which a supply of unillustrated tiedown straps may be stored until needed. Access to the storage compartment 40 is facilitated by a hinged door 42, and any conventional means of locking the door in a closed position may be employed to accomplish the function of the present invention 10.

The adjustable handle 16 includes a top horizontal gripping bar 44 fixedly secured between opposed first and second arm members 46, 48. The respective arm members 46, 48 are receivable within hollow rectangular arm members 50, 52, and these third and fourth arm members 50, 52 are each respectively, pivotally attached to the second support plate 24 by a pair of upstanding support members 54, 56. As shown in FIG. 3, the support member 54 is pivotally attached to the arm 50 by an axle in the form of a rivet 58, and a similar connection exists between the support arm 56 and the fourth arm 52.

The adjustable length of the arm assembly 16 is achieved by the slidable movement of the first and second arms 46, 48 within the respective third and fourth arms 50, 52, and as shown in FIG. 4, manual threaded locking means 60 may be employed to fixedly secure the arms together once the desired length has been achieved. The threading locking means 60 consists simply of a manually rotatable threaded lock screw which extends through each of the third and fourth arms 50, 52 so as to frictionally engage the respective arms 46, 48 to complete the lengthwise locking function.

In use, it can be seen that a cooler of a precise length can be slid down the angulated brace 20 to initially engage the first top support plate 22, and if the cooler exceeds the length of the first top support plate, the second support plate 24 can be telescopingly pulled out therefrom to increase the length of the caddy 10 until it is the precise length of the cooler. A user can then reach under the caddy and initially tighten the thumb screws 34, 36 to momentarily provide the correct length of the caddy 10, and the user can then remove the tiedown straps from the storage compartment 40. The tiedown straps are positioned over the cooler and tightly fastened to each of the tiedown strap connection hooks 38. Due to the fact that the tiedown straps are fastened to hooks on both the first and second support plates 22, 24 respectively, no further telescoping movement between the plates is possible after the cooler is fastened thereto. Once the handle assembly 16 is adjustably positioned at the correct length, a user can pull the cooler to a desired location and upon removal of the tiedown straps, the angulated brace 20 facilitates an easy upward slidable movement of the cooler so as to allow it to be removed from the caddy 10.

As to a further discussion of the manner of usage and operation of the present invention, the same should be apparent from the above description. Accordingly, no further discussion relating to the manner of usage and operation will be provided.

With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

What is claimed as being new and desired to be protected by Letters Pattent of the United States is as follows:

1. A new and improved cooler caddy comprising:

a cooler;

a support platform, said support platform being selectively lengthwise adjustable so as to be able to accept said cooler of a specific length;

handle means pivotally attached to said support platform by way of a rivet, the handle means including a pair of telescoping arms each with a rotatable threaded lock screw which extends through each of the arms so as to effect a lengthwise locking function via friction;

first lock means for locking said support platform at a precise chosen length;

and second lock means for locking said support platform at said precise chosen length when said cooler is positioned thereon, said second lock means also fixedly securing said cooler to said support platform;

wherein said support platform comprising a first platform having a second platform telescopingly positioned therein, said second platform being slidable in and out of said first platform to adjust said precise chosen length of said support platform with the first platform having aligned and oppositely disposed rectangularly-shaped channels along the sides thereof and the second platform having rectangularly-shaped arms telescopingly received with the channels;

wherein said first lock means comprises at least one threaded member which can be rotated into a position which prevents relative movement between said first platform and said second platform, said first lock means being useable to lock said support platform at a chosen length when said cooler is not positioned thereon;

wherein said second lock means includes at least one strap designed to overlie said cooler when said cooler is positioned on said support platform, said at least one strap being operable to hold said cooler in a tight abutting relationship to said first platform and said second platform, thereby to prevent relative movement between said first platform and said second platform, said at least one strap being tied to said support platform by way of a plurality of metallic tiedown-receiving hooks;

wherein said first lock means and said second lock means can be used concurrently to prevent relative movement between said first platform and said second platform;

wherein said support platform includes an upwardly directed, angulated brace which serves to prevent said cooler from sliding off of said support platform, said brace being sloped rearwardly of said handle means, thereby to also function as a guiding surface for placing said cooler on and removing said cooler from said support platform;

wherein said caddy includes a storage compartment for said second lock means with said storage compartment being formed in said brace of said support platform, the storage component being equipped with a hinged door.

\* \* \* \* \*